Oct. 6, 1925.
H. R. REYNOLDS
AUTOMOBILE SIGNAL
Filed Oct. 29, 1924
1,556,546
2 Sheets-Sheet 1
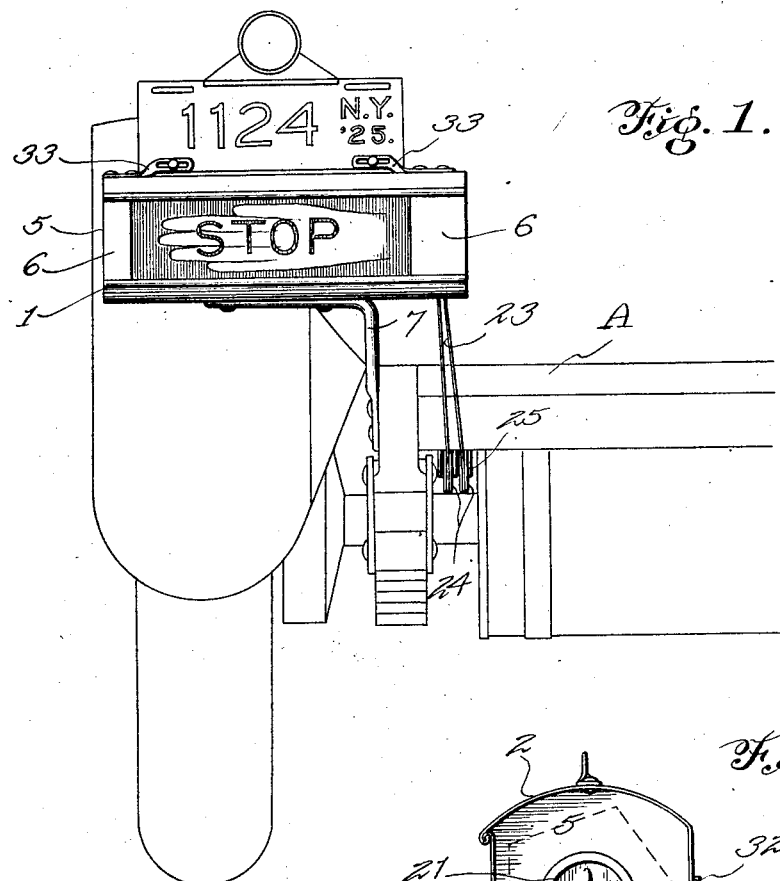
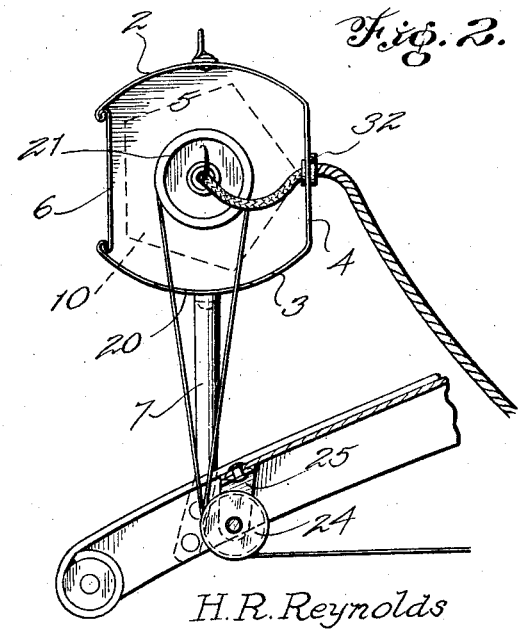
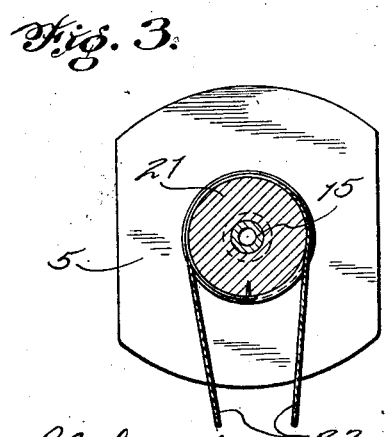
H. R. Reynolds
INVENTOR
BY Victor J. Evans
ATTORNEY
WITNESS:

Oct. 6, 1925.
H. R. REYNOLDS
1,556,546
AUTOMOBILE SIGNAL
Filed Oct. 29, 1924    2 Sheets-Sheet 2
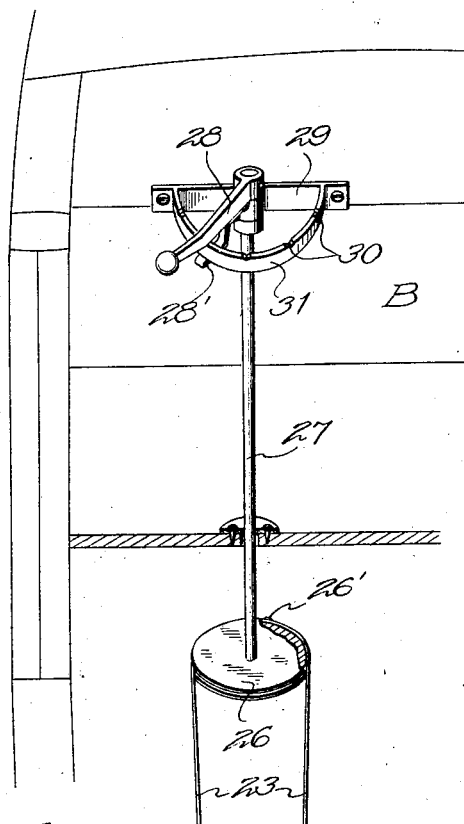
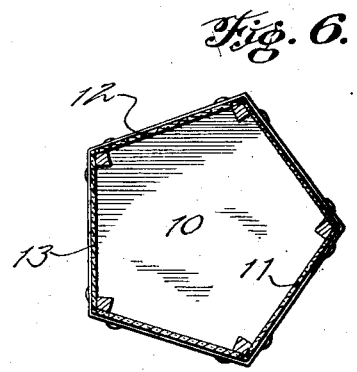
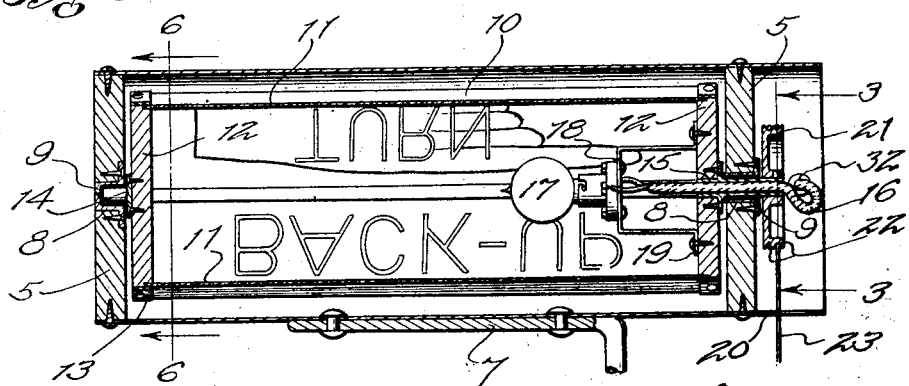

Patented Oct. 6, 1925.

1,556,546

UNITED STATES PATENT OFFICE.

HENRY R. REYNOLDS, OF WALLACE, NEW YORK.

AUTOMOBILE SIGNAL.

Application filed October 29, 1924. Serial No. 746,610.

*To all whom it may concern:*

Be it known that I, HENRY R. REYNOLDS, a citizen of the United States, residing at Wallace, in the county of Steuben and State of New York, have invented new and useful Improvements in Automobile Signals, of which the following is a specification.

This invention relates to direction signals for motor vehicles and to that type that are electrically illuminated and mechanically controlled.

The primary object of the invention is to provide a motor vehicle direction signal that will transmit to an observer of the signal the direction and driving intention of the driver of the vehicle.

Another object is to provide a direction signal for motor vehicles having mechanical means of control associated with the vehicle signal in such a manner that adequate operation of the signal is assured at all times and casual breakage and disorder of the parts reduced to a minimum.

This invention also consists in certain other features of construction and in the combination and arrangement of the several parts, to be herinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a fragmentary rear elevation of a motor vehicle showing the application of the signal lamp box which forms a portion of the present invention.

Figure 2 is a side elevation of the signal lamp box taken at right angles to Figure 1.

Figure 3 is a sectional view taken on line 3—3 of Figure 5.

Figure 4 is a view showing the application of the hand operated means for controlling the signal.

Figure 5 is a longitudinal sectional view taken through the lamp box of the signal.

Figure 6 is a sectional view taken on line 6—6 of Figure 5.

Referring to the drawings in detail the letter A indicates a fragmentary portion of the rear end of the motor vehicle and B a fragmentary portion taken in advance of the driver's seat of the vehicle.

Positioned to overlie a portion of the left hand rear fender of the vehicle is a lamp box 1 having an arcuate shaped top 2, similar shaped bottom 3, straight rear and end walls 4 and 5 respectively, and a front closed by a transparent plate 6 constructed from flexible material such as celluloid or the like. The top 2 and the bottom 3 have their front edges curved inwardly upon themselves to provide a groove to slidably receive the plate 6 which is similarly curved as shown in Figure 2 of the drawings.

The box 1 is supported in the position as above set forth by a right angle disposed rod 7 having one portion thereof fixed to the bottom 3 and its opposite portion vertically secured to the frame of the motor vehicle as shown in Figure 1 of the drawings. The box is elongated in formation and the ends 5 thereof are centrally formed with openings 8 within which are secured bearings 9.

Mounted for a limited rotatable movement within the lamp box 1 is a preferably polygonal shaped drum 10 having its side walls formed from transparent plates 11. There are preferably five of these transparent plates 11 and each bearing a legend, three of which are shown in the drawings as "Turn", "Backup", Figure 5, and "Stop", Figure 1. The plate carrying the legend stop is red and is also provided with a hand. The two remaining plates 11 have printed or otherwise formed thereon the legends "Turn" and "Safety" respectively. The plates bearing the legends turn are also provided with a hand pointed to the right and left respectively on the plates. The plates 11 are secured to the end walls 12 of the drum 10 and for this purpose the end walls 12 are grooved and provided with straps 13 which are secured and surround the drum to hold the plates in the grooves.

A stud 14 extends centrally from one end wall 12 of the drum and is received in one of the bearings 9. The opposite end wall 12 is provided with a centrally disposed opening through which passes a tubular shaft 15 and together with the stud 14 acts as an axle for the drum The inner end of the tubular shaft 15 extends into the interior portion of the drum to carry an electric conductor 16 for the lamp 17 which is horizontally disposed therein and fixed to a substantially U-shaped bracket 18 having its arms 19 bent at right angles and secured to the inner side of the last mentioned wall 12 as shown. The lamp 17 is adapted to illuminate the drum and as will be obvious the illumination will show through the plates 11 and 6 respectively.

The end wall 5 that is arranged adjacent the vertical side of the lamp box 1 is disposed inwardly from the outer edge of the top, bottom, and rear walls of the box and the extended edge of the bottom wall is provided with a recess 20 for a purpose to be presently described.

Keyed to the outer end of the shaft 15 there is a pulley wheel 21 provided with a pair of annular communicating grooves 22 to receive a double loop formed in the cable 23. The cable is looped twice around the pulley wheel to provide a frictional engagement therewith whereby the movement of the cable will cause the drum to rotate to bring the plates 11 in confronting relation with the plate 6 whereby the legends can be read through the plate 6.

The two runs of the cable 23 formed by the loops pass downwardly through the recess 20 to be received by a pulley 24 swiveled between depending bracket ears 25 extending from the rear end of one side of the vehicle frame as clearly shown in Figure 2 of the drawings. The runs of cable thence extend forwardly and have their ends secured to a grooved pulley 26 as at 26′, said pulley 26 is secured at its central portion to a rod 27 which rises therefrom and passes through the front floor board of the motor vehicle to be securely received by a handle 28 which is operatively associated with a bracket 29 secured to the instrument board of the vehicle as suggested in Figure 4 of the drawings. The handle 28 is mounted to swing in a horizontal plane and is adapted to be received in notches 30 which are arranged in equi-spaced relation upon a semi-circular part 31 of the bracket 29, whereby when the handle is arranged in any one of the notches, a plate 11 is aligned with the plate 6 of the lamp box, and there is a notch for each plate. A resilient arm 28′ cooperates with said handle and extends therefrom for engagement with the lower edge of the semi-circular part 31 and coacts with the handle to frictionally retain the same in the notches as shown in Figure 4 of the drawings. The conductor 16 extends from a tubular shaft 15 and passes through a reinforced opening 32 formed in the rear wall of the box and thence extends to a source of electrical current to provide means for illuminating the lamp 17 as above set forth.

Rising from the top wall 2 of the lamp box are a pair of aligned brackets 33 having slots therein for the purpose of adjustably receiving a license bracket as clearly disclosed in Figure 1 of the drawings. As above set forth there is a notch 30 for each plate 11 of the drum and the driver of the vehicle which is provided with one of the direction signals above described will have knowledge of which notch that is adapted for the respective plates. When the hand lever 28 is positioned in the first notch as shown, one of the plates 11 is arranged in confronting relation with the plates 6 and when the hand lever is positioned in the second notch, the adjacent plate 11 is arranged in confronting relation with the plate 6 and so on.

A suitable switch may be provided for controlling the lamp 17 when the signal is to be used in day time, and this switch may be arranged in convenient position adjacent the driver's seat.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A vehicle signal of the character described comprising an elongated box, a right angle disposed arm securing said box to the frame of the vehicle in a manner whereby it is adapted to overlie the left hand rear fender of the vehicle, a polygonal shaped drum mounted for rotation in said box and being provided with transparent side walls bearing legends, arcuate shaped top and bottom walls included in said box and having their free horizontal edges curved upon themselves to provide grooves, a transparent plate received in the grooves and forming the rear wall of the box, a substantially U-shaped bracket inwardly extending from one end wall of the drum, a lamp supported by the U-shaped bracket and being adapted to illuminate the drum whereby the rays of illumination will pass through the side wall of the drum confronting the transparent wall of the box as and for the purpose specified.

In testimony whereof I affix my signature.

HENRY R. REYNOLDS.